United States Patent
Tada et al.

(10) Patent No.: US 10,274,211 B2
(45) Date of Patent: Apr. 30, 2019

(54) AIR CONDITIONER

(71) Applicant: Johnson Controls-Hitachi Air Conditioning Technology (Hong Kong) Limited, Hong Kong (CN)

(72) Inventors: Shuuhei Tada, Tokyo (JP); Katsuaki Nagahashi, Tokyo (JP); Koji Naito, Tokyo (JP); Kazumoto Urata, Tokyo (JP); Hayato Mori, Tokyo (JP)

(73) Assignee: Hitachi-Johnson Controls Air Conditioning, Inc., Tokyo (JP)

( * ) Notice: Subject to any disclaimer, the term of this patent is extended or adjusted under 35 U.S.C. 154(b) by 0 days.

(21) Appl. No.: 15/562,514

(22) PCT Filed: Apr. 7, 2015

(86) PCT No.: PCT/JP2015/060811
§ 371 (c)(1),
(2) Date: Sep. 28, 2017

(87) PCT Pub. No.: WO2016/162939
PCT Pub. Date: Oct. 13, 2016

(65) Prior Publication Data
US 2018/0094822 A1    Apr. 5, 2018

(51) Int. Cl.
*F24F 1/14*    (2011.01)
*F24F 1/38*    (2011.01)
(Continued)

(52) U.S. Cl.
CPC .................. *F24F 1/14* (2013.01); *F24F 1/38* (2013.01); *F24F 11/89* (2018.01); *F24F 13/24* (2013.01);
(Continued)

(58) Field of Classification Search
CPC ........ F24F 1/14; F24F 1/40; F24F 1/38; F24F 11/74; F24F 11/89; F24F 13/24;
(Continued)

(56) References Cited

U.S. PATENT DOCUMENTS

| | | | | |
|---|---|---|---|---|
| 2,290,875 A | * | 7/1942 | Greibach | G01R 19/18 324/111 |
| 3,561,261 A | * | 2/1971 | Conniff et al. | G01M 7/00 318/35 |

(Continued)

FOREIGN PATENT DOCUMENTS

| | | | | |
|---|---|---|---|---|
| CN | 103460596 A | | 12/2013 | |
| GB | 2442177 A | * | 3/2008 | E02F 9/226 |

(Continued)

OTHER PUBLICATIONS

International Search Report of PCT/JP2015/060811 dated Jul. 14, 2015.

(Continued)

*Primary Examiner* — Ljiljana V. Ciric
*Assistant Examiner* — Kirstin U Oswald
(74) *Attorney, Agent, or Firm* — Mattingly & Malur, PC

(57) ABSTRACT

An air conditioner capable of detecting resonance of a casing of an outdoor or indoor unit of an air conditioner at a low cost with high accuracy is provided. An outdoor unit of the air conditioner includes: a propeller fan that blows air to a heat exchanger; a fan motor that drives the propeller fan; a current detector that detects a current value of the fan motor; a phase detector that detects the magnetic pole position of the fan motor; a fan rotation speed detector that detects the rotation speed of the fan motor; a pulsation detector that detects pulsation of the current value; and a resonance determiner that determines resonance of a system of a casing of the outdoor unit having the fan motor. If the (Continued)

resonance determiner determines resonance, a controller executes resonance avoidance control for increasing or decreasing the fan rotation speed by a predetermined rotation speed.

5 Claims, 9 Drawing Sheets

(51) Int. Cl.

| | | |
|---|---|---|
| F24F 1/40 | (2011.01) | |
| F25B 49/02 | (2006.01) | |
| F24F 13/24 | (2006.01) | |
| F24F 11/89 | (2018.01) | |
| F24F 11/74 | (2018.01) | |
| H02M 1/00 | (2006.01) | |
| H02P 6/18 | (2016.01) | |
| F24F 130/40 | (2018.01) | |

(52) U.S. Cl.
CPC .............. *F25B 49/025* (2013.01); *F24F 1/40* (2013.01); *F24F 11/74* (2018.01); *F24F 2130/40* (2018.01); *F25B 49/022* (2013.01); *F25B 2700/151* (2013.01); *H02M 2001/0009* (2013.01); *H02P 6/18* (2013.01)

(58) Field of Classification Search
CPC ................ F24F 2130/40; H02P 6/18; H02M 2001/0009; F25B 49/025; F25B 49/022; F25B 2700/151
USPC ........................................................ 62/259.1
See application file for complete search history.

(56) References Cited

U.S. PATENT DOCUMENTS

| | | | | |
|---|---|---|---|---|
| 3,755,129 A * | 8/1973 | Suzuki | ................... | B23H 3/02 204/225 |
| 4,015,182 A * | 3/1977 | Erdman | ................... | F23N 3/082 318/400.08 |
| 4,295,792 A * | 10/1981 | Tachibana | ............ | F04D 25/02 192/48.614 |
| 4,349,898 A * | 9/1982 | Drewes | ................... | F41B 15/00 367/138 |
| 4,375,224 A * | 3/1983 | Noll | ....................... | F24F 11/745 137/486 |
| 4,485,635 A * | 12/1984 | Sakano | ................ | B60H 1/3216 62/209 |
| 4,706,470 A * | 11/1987 | Akazawa | .............. | F04B 35/045 417/417 |
| 4,980,617 A * | 12/1990 | Tajima | ................... | H02P 6/006 318/400.04 |
| 5,195,327 A * | 3/1993 | Kim | ....................... | F01M 5/005 62/158 |
| 5,255,529 A * | 10/1993 | Powell | ................ | B60H 1/3205 62/180 |
| 5,286,941 A * | 2/1994 | Bel | ........................... | H03L 5/02 219/121.36 |
| 5,294,048 A * | 3/1994 | Kawasaki | ............. | B60H 1/008 236/49.3 |
| 5,332,151 A * | 7/1994 | Kwak | ................... | F24F 11/0001 236/49.3 |
| 5,379,606 A * | 1/1995 | Katsuki | .................. | F24F 3/065 62/126 |
| 5,396,779 A * | 3/1995 | Voss | ................... | B60H 1/00792 62/196.2 |
| 5,492,273 A * | 2/1996 | Shah | ....................... | H02P 6/085 236/44 A |
| 5,508,574 A * | 4/1996 | Vlock | ................... | B60K 6/445 310/113 |
| 5,632,155 A * | 5/1997 | Sugiyama | ............. | F24F 1/0003 62/179 |
| 5,650,697 A * | 7/1997 | Imagi | ...................... | H02P 25/14 318/400.3 |
| 5,724,826 A * | 3/1998 | Han | ........................ | F24F 1/06 62/183 |
| 5,823,004 A * | 10/1998 | Polley | ...................... | F24F 11/77 62/179 |
| 5,850,130 A * | 12/1998 | Fujisaki | .................. | C22C 1/02 318/400.2 |
| 5,857,349 A * | 1/1999 | Hamaoka | ............... | F25B 49/025 62/158 |
| 6,065,298 A * | 5/2000 | Fujimoto | ............... | F25B 49/025 62/230 |
| 6,147,465 A * | 11/2000 | Hollenbeck | ............ | H02P 6/20 318/400.08 |
| 6,388,416 B1 * | 5/2002 | Nakatani | ................. | H02P 6/085 318/700 |
| 6,859,001 B2 | 2/2005 | Kane et al. | | |
| 6,954,684 B2 * | 10/2005 | Frankel | ............... | G05D 23/1902 361/695 |
| 7,161,323 B2 * | 1/2007 | Ajima | .................... | B62D 5/046 318/560 |
| 7,539,549 B1 * | 5/2009 | Discenzo | ............ | F04D 15/0077 324/765.01 |
| 8,428,817 B2 * | 4/2013 | Yamaguchi | ............ | B60H 1/004 62/228.1 |
| 9,057,378 B2 * | 6/2015 | Franz | .................... | F04D 27/004 |
| 9,243,644 B2 * | 1/2016 | Bagni | ...................... | F02C 3/10 |
| 9,618,249 B2 * | 4/2017 | Hatakeyama | ......... | F25B 49/025 |
| 2003/0021699 A1 * | 1/2003 | Miyagawa | ............ | B60H 1/3208 417/223 |
| 2003/0177773 A1 * | 9/2003 | Kim | ....................... | F04B 35/045 62/156 |
| 2003/0234625 A1 * | 12/2003 | Frankel | ................... | G06F 1/206 318/268 |
| 2005/0099743 A1 * | 5/2005 | Lee | ........................ | H02H 3/027 361/42 |
| 2005/0196157 A1 * | 9/2005 | Fung | ....................... | H02P 7/29 388/804 |
| 2005/0237717 A1 * | 10/2005 | Babb | ........................ | G06F 1/206 361/697 |
| 2005/0262858 A1 * | 12/2005 | Inaba | ................. | B60H 1/00878 62/190 |
| 2006/0112699 A1 * | 6/2006 | Sato | .......................... | A23L 3/26 62/78 |
| 2007/0069670 A1 * | 3/2007 | Lin | ......................... | F04D 25/08 318/400.01 |
| 2007/0096665 A1 * | 5/2007 | Ku | .......................... | G06F 1/206 318/66 |
| 2007/0110558 A1 * | 5/2007 | Chen | ..................... | F04D 25/166 415/47 |
| 2007/0116577 A1 * | 5/2007 | Chen | ..................... | F04D 27/004 417/7 |
| 2007/0145920 A1 * | 6/2007 | Wu | ........................ | F04D 25/16 318/268 |
| 2009/0138129 A1 * | 5/2009 | Setoguchi | ............... | F25B 41/04 700/282 |
| 2009/0237961 A1 * | 9/2009 | Sakakibara | ............ | H02M 5/458 363/37 |
| 2009/0280988 A1 * | 11/2009 | Koizumi | ................ | H02K 5/128 505/162 |
| 2010/0139306 A1 * | 6/2010 | Krenik | .................... | F25B 9/004 62/402 |
| 2010/0191416 A1 * | 7/2010 | Yamaguchi | ............ | B60H 1/004 701/36 |
| 2011/0043147 A1 * | 2/2011 | Lin | ......................... | H02P 6/06 318/400.06 |
| 2011/0043148 A1 * | 2/2011 | Lin | ........................ | H02P 6/085 318/400.13 |
| 2011/0083467 A1 * | 4/2011 | Asano | .................... | F25B 49/025 62/498 |
| 2011/0256005 A1 * | 10/2011 | Takeoka | ................ | H02P 6/18 417/415 |
| 2012/0017856 A1 * | 1/2012 | Nicgorski | ............... | F01P 7/048 123/41.11 |
| 2012/0111043 A1 * | 5/2012 | Hatakeyama | ....... | F04C 29/0085 62/190 |

(56) References Cited

U.S. PATENT DOCUMENTS

| | | | | |
|---|---|---|---|---|
| 2012/0224322 A1* | 9/2012 | Artman | ..................... | G06F 1/20 361/679.48 |
| 2012/0260687 A1* | 10/2012 | Inaniwa | .................... | B04B 9/10 62/196.1 |
| 2013/0079933 A1* | 3/2013 | Tan | ........................... | G06F 1/20 700/280 |
| 2015/0168033 A1* | 6/2015 | Yamakawa | ............. | H02P 27/02 62/324.6 |

FOREIGN PATENT DOCUMENTS

| | | | | |
|---|---|---|---|---|
| GB | 2442177 A | * | 3/2008 | ............. E02F 9/226 |
| JP | 06-257592 A | | 9/1994 | |
| JP | 2003-111473 A | | 4/2003 | |
| JP | 2004-198029 A | | 7/2004 | |
| JP | 2010-065594 A | | 3/2010 | |
| JP | 2013-234797 A | | 11/2013 | |
| JP | 2013-253731 A | | 12/2013 | |
| JP | 2014-214642 A | | 11/2014 | |

OTHER PUBLICATIONS

Extended European Search Report received in corresponding European Application No. 15888433.8 dated Oct. 25, 2018.

* cited by examiner

AIR CONDITIONER

TECHNICAL FIELD

The present invention relates to an air conditioner.

BACKGROUND ART

In recent years, even if the raw material cost rises, it is difficult to add it to the product selling price, and then a product is required to have a lower cost. In addition, an air conditioner is also required to appeal energy saving and noise reduction as important factors of an air conditioning product. Injection molded products made of a resin material are often used in air conditioners as propeller fans adopted in many blowers of outdoor units, and turbo fans in ceiling cassette four-direction blowers of indoor units, for example. The injection molded product made of the resin material, not sheet metal, has high degree of freedom in shape and is advantageous for mass production to achieve high efficiency, low noise, and a low cost. Generally, a fan of a blower blows in the outdoor unit of an air conditioner at a rotation speed in a wide range such as from about 100 rpm to about 1000 rpm, which is calculated from such as an ambient temperature and a temperature of refrigerant in the refrigeration cycle of the air conditioner. Therefore, vibration and noise may be increased at a specific rotation speed due to resonance with a casing of the air conditioner. Increase in vibration and noise due to resonance is a serious problem for the user of the air conditioner, and therefore a rotation speed in resonance with the casing of the air conditioner is investigated in advance to devise such as a way of exerting control without using the rotation speed.

On another note, there are many cases where a plurality of outdoor units of an air conditioner, such as outdoor units of multi-split air conditioner for office buildings, are installed in bulk on the rooftop of an office building. In such cases, the outdoor units of the air conditioners are often arranged on vibration isolation racks at the time of installing the air conditioners, in order to avoid transmitting the vibration to the building structure. In addition, in Tohoku, Hokkaido, and Hokuriku districts of Japan, a rack may be made in order to install an outdoor unit of an air conditioner at a height with snow cover taken into account, for preventing the heat exchanger of the outdoor unit from being buried by snow coverage, to arrange the outdoor unit on the rack. Further, an indoor unit of an air conditioner may require hanging bolts for hanging the indoor unit to have different lengths depending on installation points due to the structure of the building at the time of installing the indoor unit. Accordingly, the natural vibration frequency in the state of the air conditioner being hung differs little by little depending on the installation conditions. In these cases, the natural vibration value obtained by integrating the outdoor unit of the air conditioner and the rack varies depending on the installation condition at the site.

Japanese Patent Application Publication No. 2010-065594 discloses a failure diagnosis apparatus of an electric blower including: a detection device that detects at least one of vibration and noise generated from an electric blower; and a controller that compares frequency components of the detected at least one of vibration and noise with the frequency components specific to the normal electric blower to detect a failure of the electric blower and to determine a failure mode.

Japanese Patent Application Publication No. 2013-234797 discloses an air conditioner including: a vibration detector that detects vibration of a blower arranged in a casing; and a controller that controls the blower based on output from the vibration detector, wherein the vibration detector is arranged on a support plate of the blower so as to detect vibration in the transverse direction of the casing.

SUMMARY OF THE INVENTION

Problems to be Solved

The failure diagnosis apparatus of the electric blower disclosed in Japanese Patent Application Publication No. 2010-065594 requires an operation means having high processing power for higher level operations than those for controlling the air conditioner, in order to analyze frequencies of vibration or noise. This hinders the use of an inexpensive microcomputer to have a problem that the cost increases.

In the air conditioner disclosed in Japanese Patent Application Publication No. 2013-234797, disturbances such as gusts, earthquakes, vibration during maintenance and inspection may cause a vibration sensor to erroneously detect vibration. In addition, as the vibration sensor is required, there is a problem that the cost increases.

Further, the apparatuses described in the above-mentioned Patent Japanese Patent Application Publication No. 2010-065594 and Japanese Patent Application Publication No. 2013-234797 are each configured to stop operation of the air conditioner after detecting an abnormality, and this causes the following problem. That is, even when a specific frequency component increases to cause resonance to be detected, a situation has been found in which the resonance is not so abnormal that operation of the air conditioner is stopped. In such a situation, stopping the air conditioner uniformly on detecting resonance has a problem.

The present invention is intended to provide an air conditioner capable of detecting resonance of a casing of an outdoor or indoor unit of an air conditioner at a low cost with high accuracy.

Solution to Problems

In order to solve the above problems, an air conditioner of the present invention includes: a fan that blows air to a heat exchanger; a motor that drives the fan; a rotation speed detector that detects a rotation speed of the motor; a current detector that detects a current value of the motor; a phase detector that detects a magnetic pole position of the motor; a pulsation detector that detects pulsation of the current value based on the detected current value and magnetic pole position of the motor; and a resonance determiner that determines resonance of a casing of an outdoor or indoor unit having the motor, based on the detected pulsation of the current value and rotation speed.

Advantageous Effects of the Invention

The present invention provides an air conditioner capable of detecting resonance of a casing of an outdoor or indoor unit of an air conditioner at a low cost with high accuracy.

DETAILED DESCRIPTION OF EMBODIMENTS

First Embodiment

Figure 1:
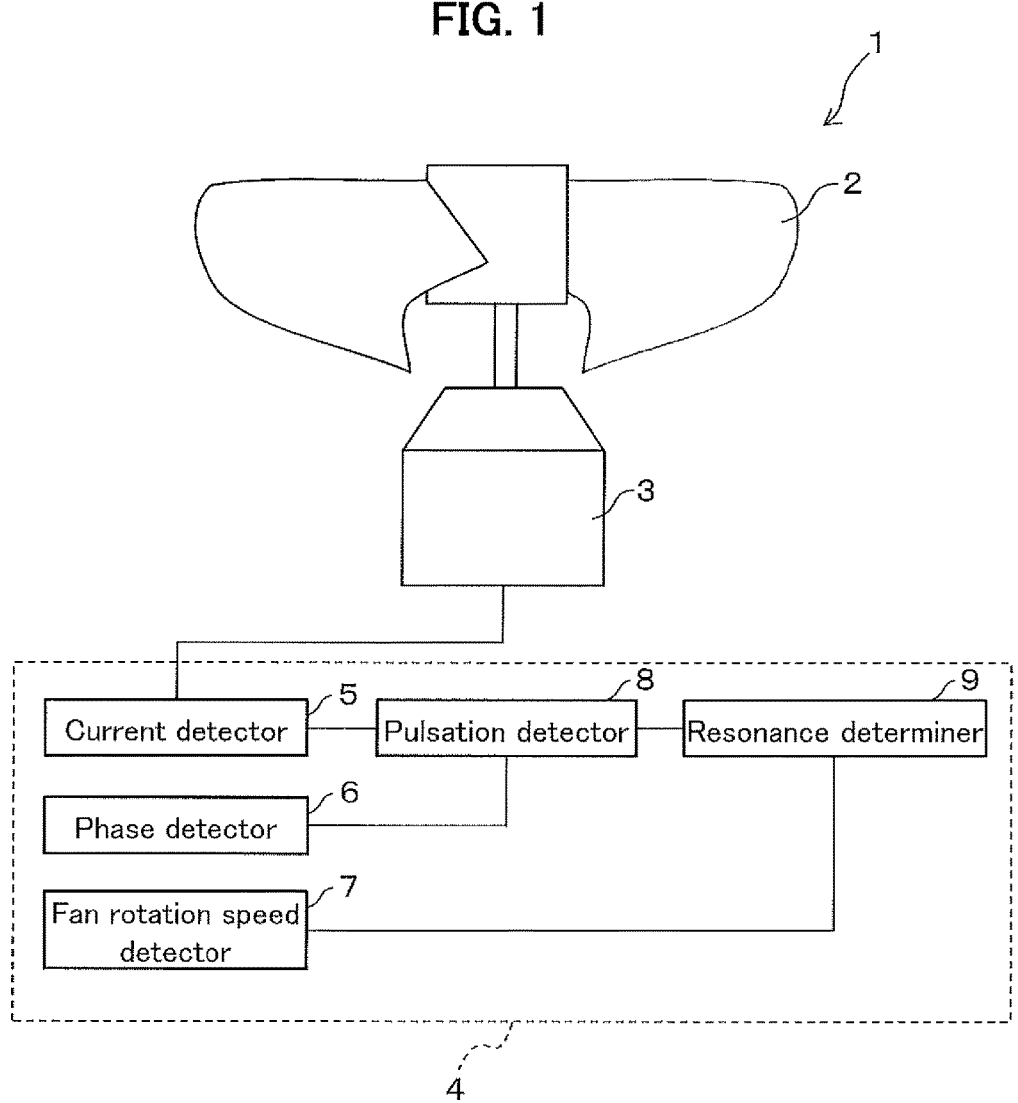
FIG. 1 is a diagram showing a configuration of an outdoor unit of an air conditioner according to a first embodiment of the present invention.

Hereinafter, embodiments of the present invention will be described in detail with reference to the drawings. FIG. 1 is a diagram showing a configuration of an outdoor unit 1 of an air conditioner according to a first embodiment of the present invention. An air conditioner has its outdoor unit and indoor unit (not shown) connected to each other by a refrigerant piping to constitute a refrigeration cycle for air conditioning. As shown in FIG. 1, the outdoor unit 1 of the air conditioner includes: a propeller fan 2 that blows air to an outdoor heat exchanger (not shown); a fan motor 3 that rotationally drives the propeller fan 2; and a controller 4 that controls driving the fan motor 3 rotatably so as to be rotated at a desired rotation speed, and executes resonance avoidance control.

The propeller fan 2 is a fan for blowing air to a heat exchanger of the outdoor unit of the air conditioner. In addition, the propeller fan 2 may be a turbo fan, a sirocco fan, or a through-flow fan for blowing air to the indoor unit of the air conditioner, and the type of the blower is not limited.

The controller 4 includes: a current detector 5 that detects an output current of the fan motor 3 as a current value; a phase detector 6 that detects a magnetic pole position of the fan motor 3; a fan rotation speed detector 7 that detects the rotation speed of the fan motor 3 as a fan rotation speed; a pulsation detector 8 that detects pulsation of the current value based on the detected current value and magnetic pole position of the fan motor 3; and a resonance determiner 9 that determines resonance of a casing system of an outdoor or indoor unit having the fan motor 3 based on the detected pulsation of the current value and fan rotation speed.

If the resonance determiner 9 determines resonance, the controller 4 executes resonance avoidance control (see FIGS. 5 and 6) for increasing or decreasing the fan rotation speed by a predetermined rotation speed. The controller 4 adjusts the rotation speed of the fan motor 3 based on the result of resonance determination by the resonance determiner 9 to avoid from being in resonance. That is, when the resonance determiner 9 determines resonance, the controller 4 attempts to adjust the fan rotation speed to avoid from being in resonance.

The pulsation detector 8 detects pulsation of a value of the current of the fan motor 3 (hereinafter referred to as a value of the motor current) from the results of detection by the current detector 4 and the phase detector 5.

The resonance determiner 9 determines resonance again after the controller 4 has increased or decreased the fan rotation speed, and determines that the resonance is abnormal if resonance is determined. The resonance determiner 9 determines resonance again after the controller 4 has increased or decreased the fan rotation speed, and the controller 4 continues operation using the fan rotation speed if resonance is not determined.

Figure 2:
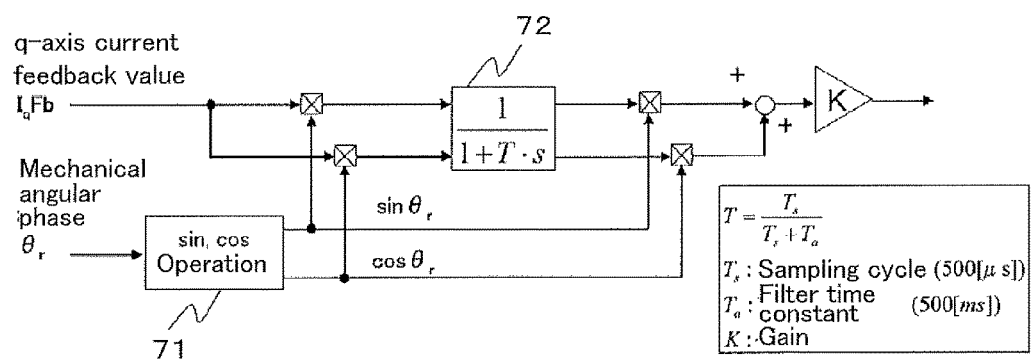
FIG. 2 is a diagram showing an example configuration of a pulsation detector of the outdoor unit of the air conditioner according to the first embodiment.

Hereinbelow, a description will be given of the operation of the outdoor unit 1 of the air conditioner configured as described above. First, a description will be given of a method of detecting pulsation of the motor current due to the torque fluctuation caused by the resonance of the propeller fan 2. FIG. 2 is a diagram showing an example configuration of the pulsation detector 8. Before this, the current detector 5 detects three-phase output currents (Iu, Iv, Iw) from the fan motor 3. Specifically, the current flowing in the direct current part of an inverter (not shown) that drives the fan motor 3 is measured from the voltage generated across a shunt resistor (not shown). Then, the motor current (Iu, Iv, Iw) is derived by a current operation part, not shown, in the controller 4. Note that methods of detecting the motor current (Iu, Iv, Iw) include various methods such as connecting a resistance having a small resistance value to a point outputting the motor current to detect the motor current from the voltage applied across the resistance, and detecting the motor current by a current sensor. The detected motor current (Iu, Iv, Iw) is converted through αβ conversion and then dq conversion in accordance with the following Equation (1), and the result is processed by first-order lag filtering to calculate a q-axis current feedback value, which is an input value to the pulsation detector 8.

$$\begin{bmatrix} i_\alpha \\ i_\beta \end{bmatrix} = \frac{2}{3}\begin{bmatrix} 1 & -\cos 60° & -\cos 60° \\ 0 & +\cos 30° & -\cos 30° \end{bmatrix} \cdot \begin{bmatrix} i_u \\ i_v \\ i_w \end{bmatrix} = \frac{2}{3}\begin{bmatrix} 1 & -\frac{1}{2} & -\frac{1}{2} \\ 0 & +\frac{\sqrt{3}}{2} & -\frac{\sqrt{3}}{2} \end{bmatrix} \cdot \begin{bmatrix} i_u \\ i_v \\ i_w \end{bmatrix}$$

$$\begin{bmatrix} i_d \\ i_q \end{bmatrix} = \begin{bmatrix} \cos\theta_{dc} & \sin\theta_{dc} \\ -\sin\theta_{dc} & \cos\theta_{dc} \end{bmatrix} \cdot \begin{bmatrix} i_\alpha \\ i_\beta \end{bmatrix}.$$

(1)

In Equation (1), θdc at the time of dq conversion is the d-axis phase to indicate the magnetic pole position of the fan motor. A mechanical angle phase θr as the second input value to the pulsation detector 8 is calculated from θdc. It is expressed by the following Equation (2).

$$\Delta\theta_r = \Delta\theta_{dc}/(\text{number of pole pairs}) \qquad (2).$$

Δθr is integrated to calculate θr. The pulsation component is extracted from the two inputs above, i.e., the q-axis current feedback value and the mechanical angular phase θr.

As shown in FIG. 2, the mechanical angular phase θr allows sin-cos operation 71 to calculate sin θr and cos θr, which are each multiplied with the q-axis current feedback value for a first-order lag filtering process 72 to remove high frequency components. Here, the set value of the time constant for the first-order lag filtering process is set through simulation based on the test using the actual machine so that a cycle length of the torque pulsation can be extracted. That is, in setting the filter time constant, the filter time constant needs to be set larger than the pulsation cycle in order to extract the pulsation component, and thus a time constant is set to be larger than the rotation cycle of the propeller fan 2 in which torque pulsation may occur. The outputs from the first-order lag filtering process 72 are each multiplied with sin θr and cos θr again, and then added together to adjust the pulsation component with an adjustment gain K for extracting the pulsation component only which is in pulsation at the cycle of the mechanical angular phase θr. An example of set values of sampling cycle and the filter time constant is shown in FIG. 2.

Figure 3:
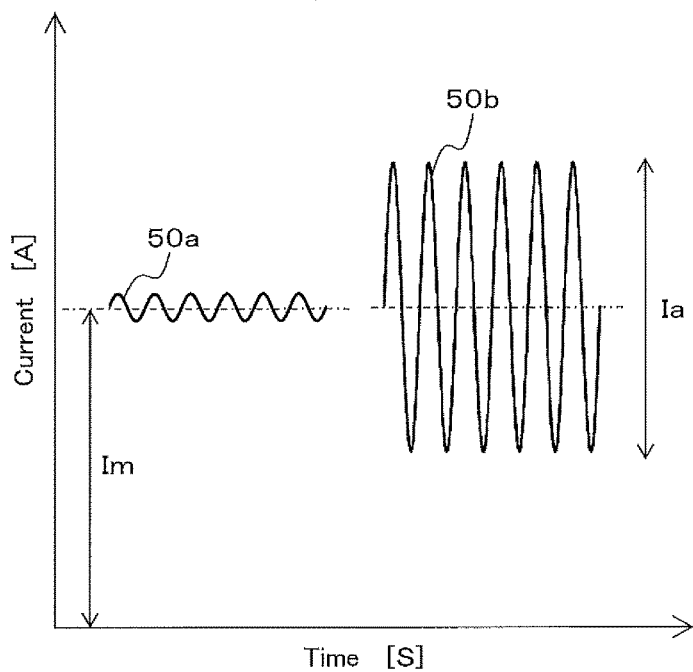
FIG. 3 is a waveform chart showing pulsation of a current when the air conditioner according to the first embodiment is in resonance.

Next, a description will be given of a procedure of determining resonance from the detected current value. FIG. 3 is a waveform chart showing the pulsation of a current when the air conditioner is in resonance. A curve 50a shown in FIG. 3 shows a current value waveform in a non-resonance state, while a curve 50b shows a current value waveform in a resonance state. The current detector 5 in FIG. 1 detects the fan motor current every moment. If the outdoor unit 1 or indoor unit of the air conditioner is in a resonance state, the torque fluctuation of the fan motor 3 becomes larger than that in a non-resonance state to cause the current flowing in the fan motor 3 to have the same change. For this reason, the pulsation (or amplitude) Ia increases with respect to the mean current value Im as shown with the curve 50b in FIG. 3. The flowing current also increases with the increasing rotation speed of the fan motor 3 so that the mean current value Im also increases. Resonance determination can be made using the pulsation current value Ia.

Figure 4:
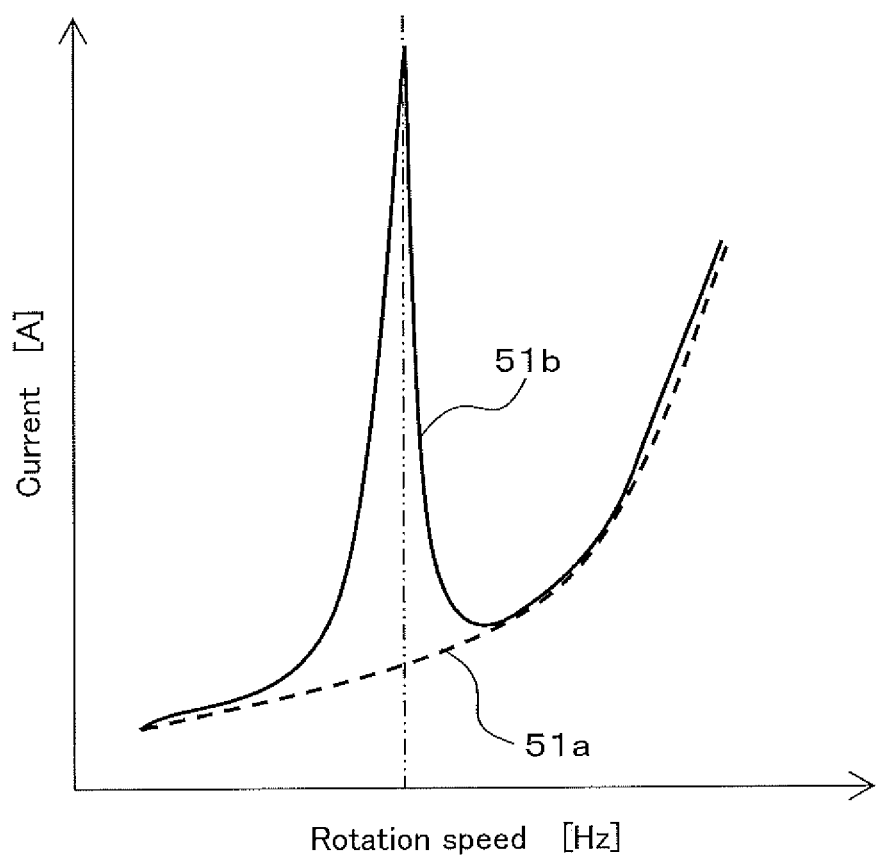
FIG. 4 is a chart showing a relationship between a fan rotation speed and a pulsation current value when the casing of the air conditioner according to the first embodiment is in resonance.

FIG. 4 is a chart showing a relationship between the fan rotation speed and the pulsation current value when the casing of the air conditioner is in resonance. In FIG. 4, a curve 51b indicates a case where there is resonance, while a curve 51a indicates a case where there is no resonance. In FIG. 4, the curve 51a indicates a current value waveform in a non-resonance state, while the curve 51b indicates a current value waveform in a resonance state. The present inventors have found that the pulsation current value of the fan motor 3 increases in a resonance state at a certain fan rotation speed [Hz], as shown with the curve 51b in FIG. 4. This is different from the pulsation current value in a case where the propeller fan 2 is unexpectedly damaged. That is, if the propeller fan 2 is damaged, the pulsation current value increases irrespective of the rotation speed due to an imbalance state of the propeller fan 2 itself. Accordingly, when the increased pulsation current value is detected, if changing the rotation speed causes the pulsation current value to decrease, the outdoor unit 1 is determined not in a resonance state as with the damage of the propeller fan 2. Incidentally, if changing the rotation speed resolves the resonance state of the outdoor unit 1, the rotation speed used for resolving the resonance state may be used to rotate the fan of the outdoor unit 1 to allow the outdoor unit 1 to operate continuously but with less vibration, noise, and abnormal noise.

For example, if the increased pulsation current value Ia is detected, the rotation speed of the propeller fan 2 is increased or decreased. If the decreased pulsation current value Ia of the fan motor 3 is detected again after the change in the fan rotation speed, it can be determined that the rotation speed before the change has caused a resonance state. If it is determined to be in resonance, the rotation speed of the propeller fan 2 is preferably increased or decreased to operate the air conditioner in a non-resonance state.

Next, a description will be given of an example of control for determining and avoiding resonance of the outdoor unit of the air conditioner by taking the installed state into account. Note that one of first avoidance control and second avoidance control is adopted as appropriate.

<First Avoidance Control>

Figure 5:
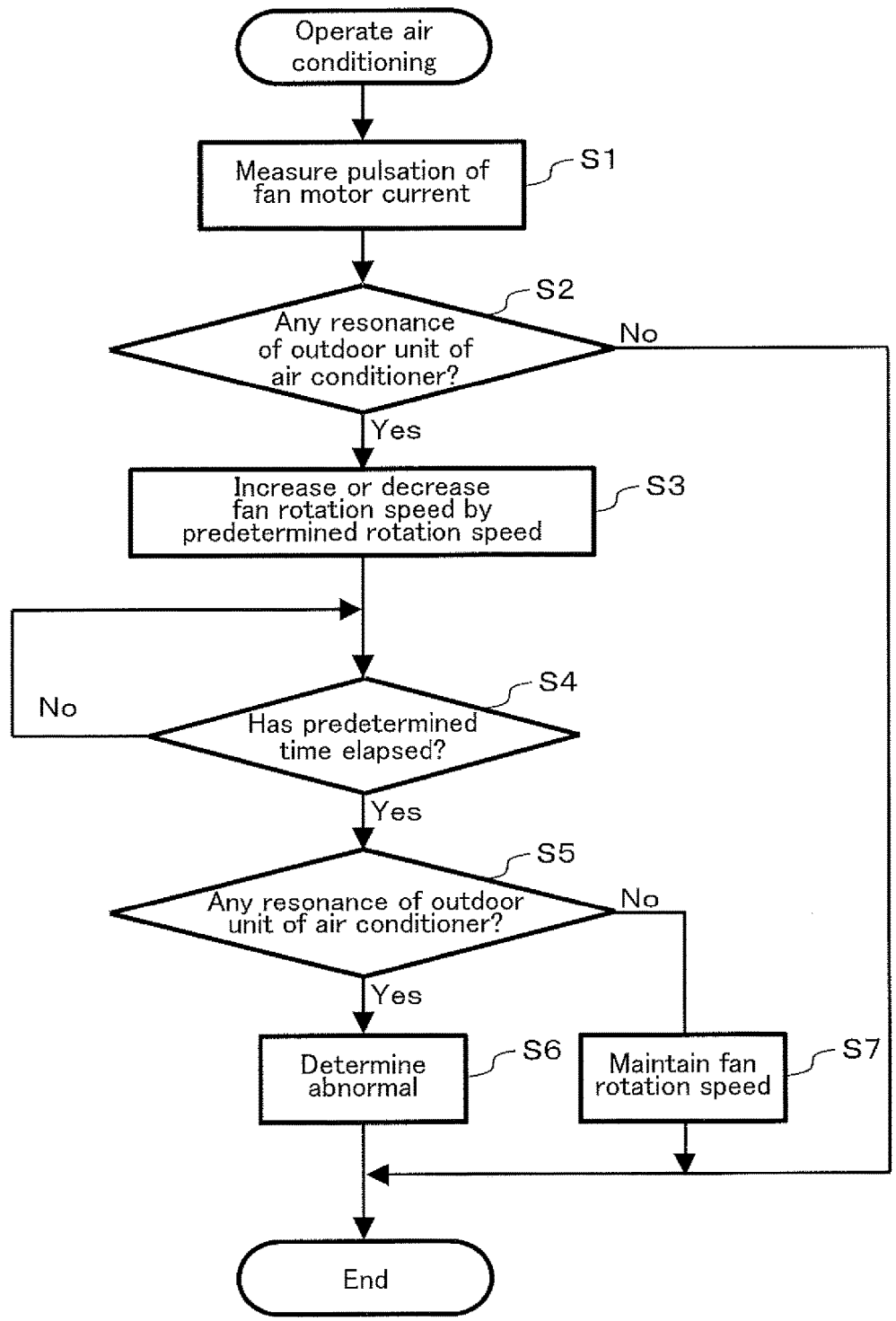
FIG. 5 is a flowchart showing first avoidance control when resonance is detected during operation of the air conditioner according to the first embodiment.

FIG. 5 is a flowchart showing the first avoidance control when resonance is detected during operation of the air conditioner. In the drawing, capital S stands for each step of the flow. This flow is executed by the controller 4 in FIG. 1 including such as a microcomputer. During operation of the air conditioner, the controller 4 measures current pulsation (pulsation of the motor current) of the fan motor 3 in the outdoor unit 1 of the air conditioner in step S1. More specifically, the current detector 5 detects the output current from the fan motor 3, and the phase detector 6 detects the magnetic pole position of the fan motor 3. The pulsation detector 8 then uses the detected output current from the fan motor 3 and its mechanical angular phase to extract pulsation of the motor current due to the torque fluctuation. In step S2, the controller 4 determines resonance of the outdoor unit 1 of the air conditioner based on pulsation of the motor current and the rotation speed of the propeller fan 2 (hereinafter referred to as the fan rotation speed) in the outdoor unit 1 of the air conditioner. If it is determined that the outdoor unit 1 of the air conditioner is not in resonance, the flow ends.

If it is determined that the outdoor unit 1 of the air conditioner is in resonance, the controller 4 changes the fan rotation speed by a predetermined rotation speed in step S3. Changing the fan rotation speed is either to increase or decrease the fan rotation speed. For example, if the air conditioner is detected to be in resonance, the controller 4 increases the fan rotation speed of the air conditioner by a predetermined rotation speed (5 rpm, for example).

The reason why changing the fan rotation speed by a predetermined rotation speed is as follows. That is, if the fan rotation speed of the air conditioner largely varies, the amount of change in the air volume of the outdoor unit 1 largely increases. This causes the amount of heat exchange in the heat exchanger to be increased to have increased fluctuation in pressure of the refrigerant in the refrigeration cycle. Then, the stable control over the refrigeration cycle of the air conditioner is disturbed. Here, the resonance point is in the vicinity of the natural frequency of the system in which the air conditioner is installed. Therefore, considering the influence to the refrigeration cycle and the characteristics of the resonance phenomenon, changing (increasing in this case) the fan rotation speed is preferably by no more than 5 rpm at a time (in one step).

In addition, increase or decrease is selected as follows for changing the fan rotation speed. That is, if the fan rotation speed is increased to increase the air volume while the heat exchanger in the refrigeration cycle is operating as an evaporator, as with the outdoor unit 1 of the air conditioner in heating operation when the ambient temperature is low, the refrigerant pressure is decreased to lower the evaporation temperature so that the frost is increased. When there is such a problem in operation of the air conditioner, changing the fan rotation speed is decreasing the speed instead of increasing the speed. Decreasing the fan rotation speed avoids resonance.

In step S4, the controller 4 determines whether or not a predetermined time has elapsed after changing the fan rotation speed by a predetermined rotation speed, and judges that the system is stable after the predetermined time (to be determined from actually measured data until the system becomes stable, and valid data after stabilization of the system cannot be obtained if this is short, while the resonance avoidance control will be delayed if this is long) has elapsed, to proceed to step S5. In step S5, the controller 4 determines resonance of the outdoor unit 1 of the air conditioner based on the pulsation of the motor current and the fan rotation speed after the fan rotation speed is changed (increased or decreased). If it is determined that the outdoor unit 1 of the air conditioner is in resonance even after the fan rotation speed is changed, the controller 4 determines in step S6 that this resonance is caused by an abnormal state ("determine abnormal"), and ends the flow. Note that if the determining abnormal is made, the controller 4 notifies the user of this by failure notification operation (not shown) and stops the fan motor 3 because an abnormality has been detected.

If it is determined in step S5 that the outdoor unit 1 of the air conditioner is not in resonance, the controller 4 determines in step S7 that the fan rotation speed is out of the resonance point of the air conditioner and maintains the fan rotation speed (the changed fan rotation speed) to end the flow. From this time on, the air conditioner continues to operate using the changed fan rotation speed.

<Second Avoidance Control>

Figure 6:
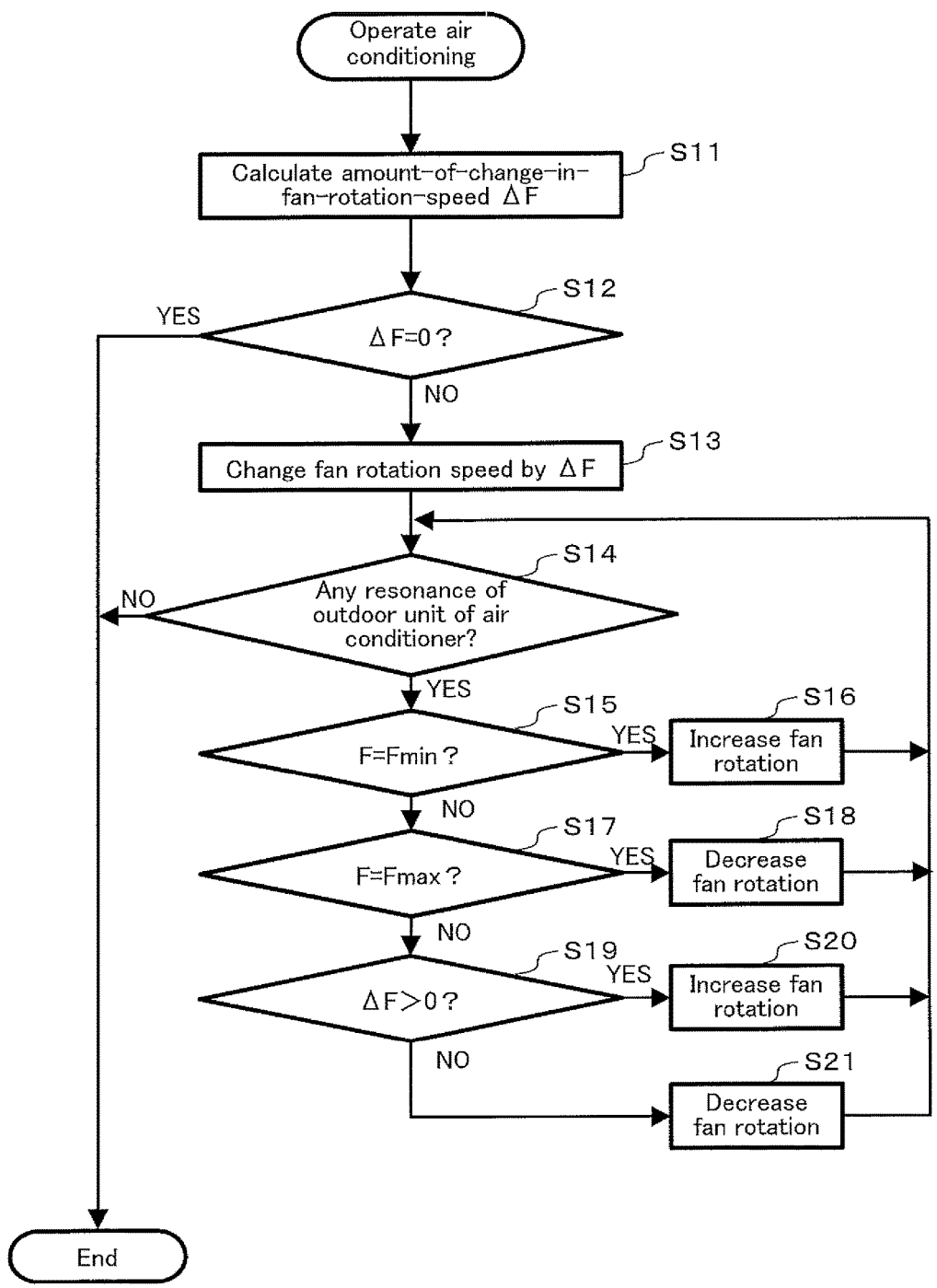
FIG. 6 is a flowchart showing second avoidance control when resonance is detected during operation of the air conditioner according to the first embodiment.

FIG. 6 is a flowchart showing second avoidance control when resonance is detected during operation of the air conditioner. The second avoidance control is executed by the controller 4 in FIG. 1 including such as a microcomputer. During operation of the air conditioner, the controller 4 calculates an amount-of-change-in-fan-rotation-speed $\Delta F$ in step S11. The amount-of-change-in-fan-rotation-speed $\Delta F$ varies depending on pressure and temperature of the refrigerant in the refrigeration cycle, and therefore the controller 4 successively calculates the amount-of-change-in-fan-rotation-speed $\Delta F$. In step S12, the controller 4 determines whether the amount-of-change-in-fan-rotation-speed $\Delta F$ is 0 ($\Delta F=0$) or not, and, if $\Delta F=0$, determines that the amount-of-change-in-fan-rotation-speed $\Delta F$ has not varied, and ends the flow. If $\Delta F \neq 0$, the controller 4 changes the current fan rotation speed F by $\Delta F$ in step S13, and proceeds to step S14.

In step S14, the controller 4 determines resonance of the outdoor unit 1 of the air conditioner when the fan rotation speed has been changed. Specifically, the controller 4 determines resonance of the outdoor unit 1 of the air conditioner based on the pulsation of the motor current and the fan rotation speed after the change by the amount-of-change-in-fan-rotation-speed $\Delta F$. If the outdoor unit 1 of the air conditioner is determined to be in resonance, the controller 4 determines in step S15 whether the current fan rotation speed F has reached the minimum specific fan rotation speed Fmin (F=Fmin).

In the case of F=Fmin (YES in step S15), the controller 4 increases (raises) the fan rotation speed by a predetermined rotation speed (10 rpm, for example) in step S16, and returns to step S14. Here, the amount of increasing or decreasing the rotation speed during the resonance avoidance control is preferably within about 10 rpm. The reason for limiting the amount of increasing or decreasing the fan rotation speed to the predetermined rotation speed or less is to prevent increasing or decreasing amount of heat exchange due to increase or decrease of the air volume from influencing performance of the air conditioner. If F # Fmin in step S15, the controller 4 proceeds to step S17. In step S17, the controller 4 determines whether the current fan rotation speed F has reached the maximum specific fan rotation speed Fmax (F=Fmax) or not.

If F=Fmax (YES in step S17), the controller 4 decreases (reduces) the fan rotation speed by a predetermined rotation speed (10 rpm, for example) in step S18, and returns to step S14. As described above, the controller 4 determines resonance when the fan rotation speed has been changed (step S14), and increases the rotation speed (step S16) if the fan rotation speed is the minimum of the specification range (YES in step S15), while decreases the rotation speed (step S18) if the fan rotation speed is the maximum of the specification range (YES in step S17). If F # Fmax in step S17, the controller 4 proceeds to step S19. In step S19, the controller 4 determines whether the amount-of-change-in-fan-rotation-speed $\Delta F$ is larger than zero ($\Delta F>0$) or not.

If the amount-of-change-in-fan-rotation-speed $\Delta F$ is larger than zero ($\Delta F>0$) (YES in step S19), the controller 4 increases the fan rotation speed by a predetermined rotation speed (10 rpm, for example) in step S20 and returns to step S14. If the amount-of-change-in-fan-rotation-speed $\Delta F$ is equal to or less than zero ($\Delta F \leq 0$), the controller 4 decreases the fan rotation speed by a predetermined rotation speed (10 rpm, for example) in step S21 and returns to step S14. Note that steps S14 to S21 each represent a step of the resonance avoidance control. Back in step S14, if the controller 4 determines that the outdoor unit 1 of the air conditioner is not in resonance even after the fan rotation speed is changed, the flow ends.

As described above, the outdoor unit 1 of the air conditioner according to the present embodiment includes: the propeller fan 2 that blows air to the heat exchanger; the fan motor 3 that drives the propeller fan 2; the current detector 5 that detects the current value of the fan motor 3; the phase detector 6 that detects the magnetic pole position of the fan motor 3; the fan rotation speed detector 7 that detects the rotation speed of the fan motor 3; the pulsation detector 8 that detects pulsation of the current value based on the detected current value and magnetic pole position of the fan motor 3; and the resonance determiner 9 that determines resonance of a system of the casing of the outdoor or indoor unit having the fan motor 3 based on the detected pulsation of the current value and fan rotation speed. If the resonance determiner 9 determines resonance, the controller 4 executes resonance avoidance control for increasing or decreasing the fan rotation speed by a predetermined rotation speed.

This configuration does not require any advanced microcomputer having high processing power or any vibration sensor to detect resonance of the casing of the outdoor unit 1 of the air conditioner at a low cost with high accuracy.

In addition, in the present embodiment, the controller 4 instructs increasing or decreasing the fan rotation speed even when resonance is determined, and then determines resonance again, to discriminate between abnormal resonance, which requires the air conditioner to stop operation, and other resonance, which does not require the air conditioner to stop operation. In other words, erroneous determination of resonance is prevented to improve accuracy of detecting resonance. Additionally, if the resonance does not require stopping operation of the air conditioner, the changed fan rotation speed is maintained to continue operation of the air conditioner.

Further, in the present embodiment, the resonance of the casing system of the outdoor unit 1 of the air conditioner is determined to allow for avoiding resonance in consideration of an on-site installation state. As described above, resonance of the outdoor or indoor unit of the air conditioner is accurately detected at low cost to provide an air conditioner capable of operating stably with less vibration, noise, and abnormal noise.

Second Embodiment

Figure 7:
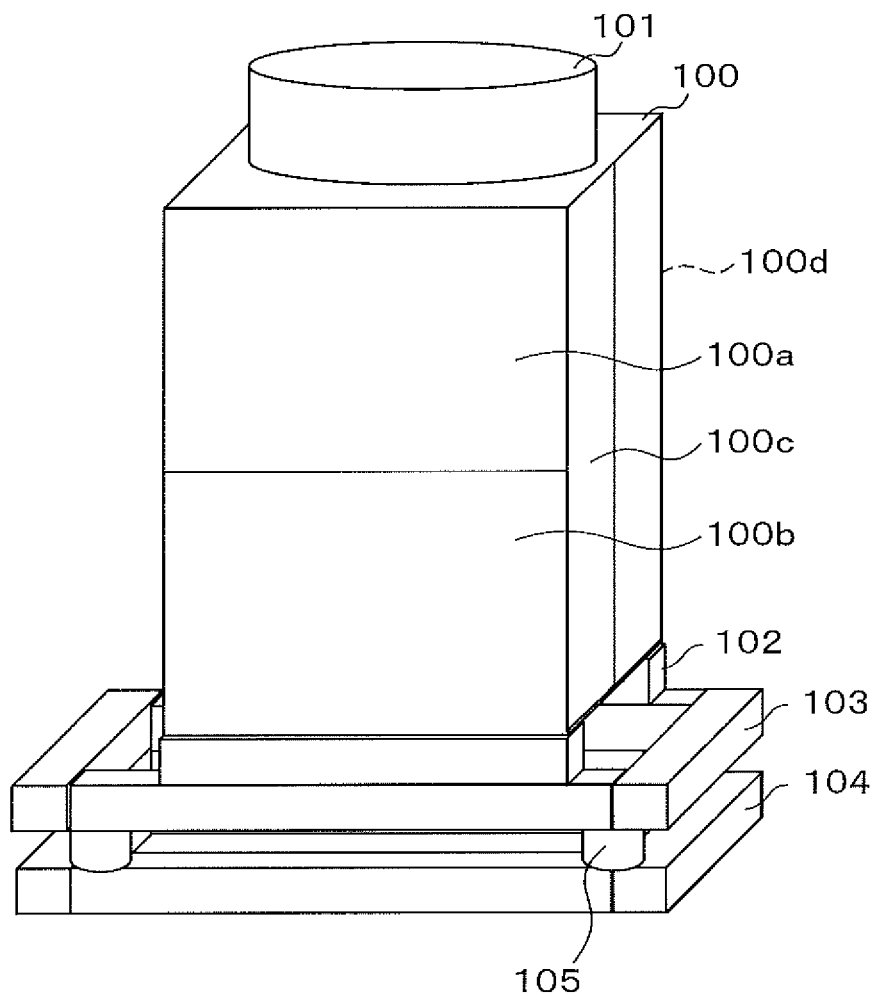
FIG. 7 is a diagram illustrating a case where an outdoor unit of an air conditioner according to a second embodiment of the present invention is installed on vibration isolation mounts.
Figure 8:
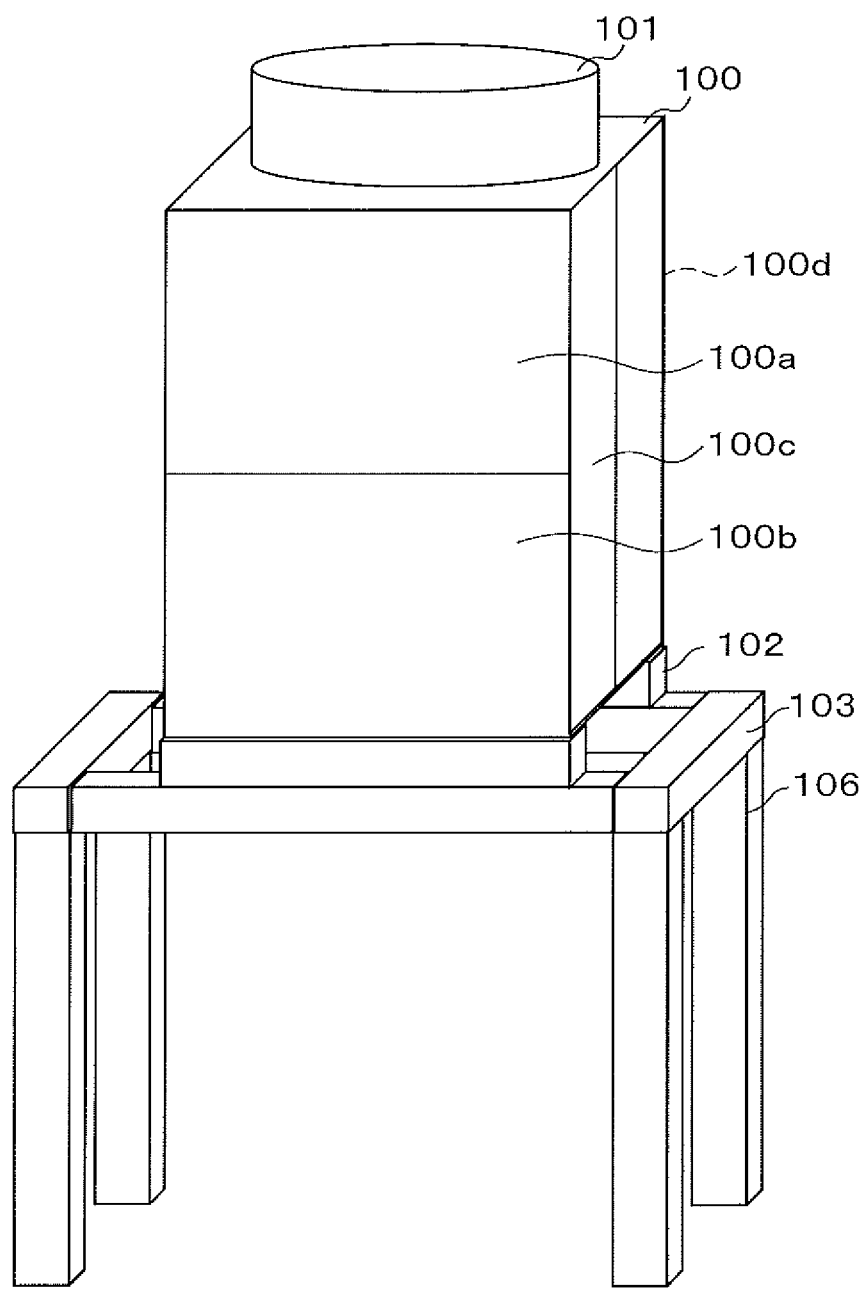
FIG. 8 is a diagram illustrating a case where the outdoor unit of the air conditioner according to the second embodiment is installed on a snowfall-area rack.

FIGS. 7 and 8 are diagrams illustrating installation cases of an air conditioner according to a second embodiment of the present invention. FIG. 7 shows a case where an outdoor unit 100 of the air conditioner is installed on vibration isolation mounts, and FIG. 8 shows a case where the outdoor unit 100 of the air conditioner is installed on a snowfall-area rack. As shown in FIG. 7, the outdoor unit 100 of the air conditioner of the present embodiment includes a blower 101 on a casing and legs 102 at the bottom. In addition, the outdoor unit 100 includes a front cover 100*a* and a service cover 100*b* on the front surface of the casing, right and left side surfaces 100*c*, and a heat exchanger 100*d* extending rearward from the right and left side surfaces to the rear. Further, the outdoor unit 100 is installed on vibration isolation mounts 103, 104. Vibration isolation rubbers 105 are disposed between the vibration isolation mounts 103, 104.

The outdoor unit 100 of the air conditioner is often installed on the roof of a building. A blower fan, a compressor, and the like have motors to cause vibration during operation. A main vibration source of the outdoor unit 100 is the following. The outdoor unit 100 of the air conditioner, if directly fixed to the building, transmits its vibration to building frames and then to living spaces of the building also, to impair comforts of residents in the building depending on the strength of the vibration.

Therefore, as shown in FIG. 7, the vibration isolation mounts 103, 104 are disposed on the building to place the outdoor unit 100 of the air conditioner on the vibration isolation mounts 103, 104. The vibration isolation mounts 103, 104 have the vibration isolation rubbers 105 therebetween. Thus, the natural frequency of the system, inclusive of the outdoor unit 100 and the vibration isolation mounts 103, 104, varies depending on installation conditions of the air conditioner such as the heights of the vibration isolation mounts 103, 104, and the number of outdoor units 100 mounted on a set of the isolation mounts 103, 104. Additionally, the spring constant of the vibration isolation rubber 105 between the vibration isolation mounts 103, 104 changes with the temperature to have different natural frequency of the system, inclusive of the outdoor unit 100 and the vibration isolation mounts 103, 104, also depending on the season.

In addition, in a case where the outdoor unit 100 of the air conditioner is installed on a snowfall-area rack, as shown in FIG. 8, the outdoor unit 100 is installed on the vibration isolation mount 103. The vibration isolation mount 103 is disposed on a rack 106 with high legs. The rack 106 has a height with a margin so as to be higher than the assumed snowfall, and the outdoor unit 100 of the air conditioner is disposed on the vibration isolation mount 103 on the rack 106. The height of the rack 106 is changed depending on the snow accumulation in the area. A different height of the rack 106 gives a different natural frequency of the system inclusive of the outdoor unit 100, the vibration isolation mount 103, and the rack 106.

In conventional cases, resonance of the casing of the air conditioner itself has been avoidable at the time of design and development, but it has been difficult to avoid resonance of the entire system in consideration of the on-site installation state as shown in FIGS. 7 and 8. In view of this, the outdoor unit 100 of the air conditioner according to the present embodiment has the resonance determination of the entire system by way of detecting pulsation of the motor current, as described in the first embodiment, included in a controller (not shown) of the outdoor unit 100 of the air conditioner according to the present embodiment. That is, the controller 4 of the outdoor unit 1 of the air conditioner in FIG. 1 is mounted as the controller of the outdoor unit 100 of the air conditioner according to the present embodiment to execute resonance avoidance control as shown with the flowchart in FIG. 5 or 6.

This allows the outdoor unit 100 of the air conditioner according to the present embodiment to determine resonance of the entire system after installation. If resonance is determined, a fan rotation speed of a blower is changed to avoid the natural frequency of the system, inclusive of the outdoor unit 100 of the air conditioner as well as the vibration isolation mounts 103, 104 and the rack 106, for timely operation. Therefore, according to the present embodiment, resonance is avoided even in various installation states. Further, in the present embodiment, the blowing by the fan of the blower is shown using a top-blown outdoor unit by way of example, but the present method of determining vibration is used similarly even for a side-blown outdoor unit to obtain the same advantageous effects.

Third Embodiment

Figure 9:
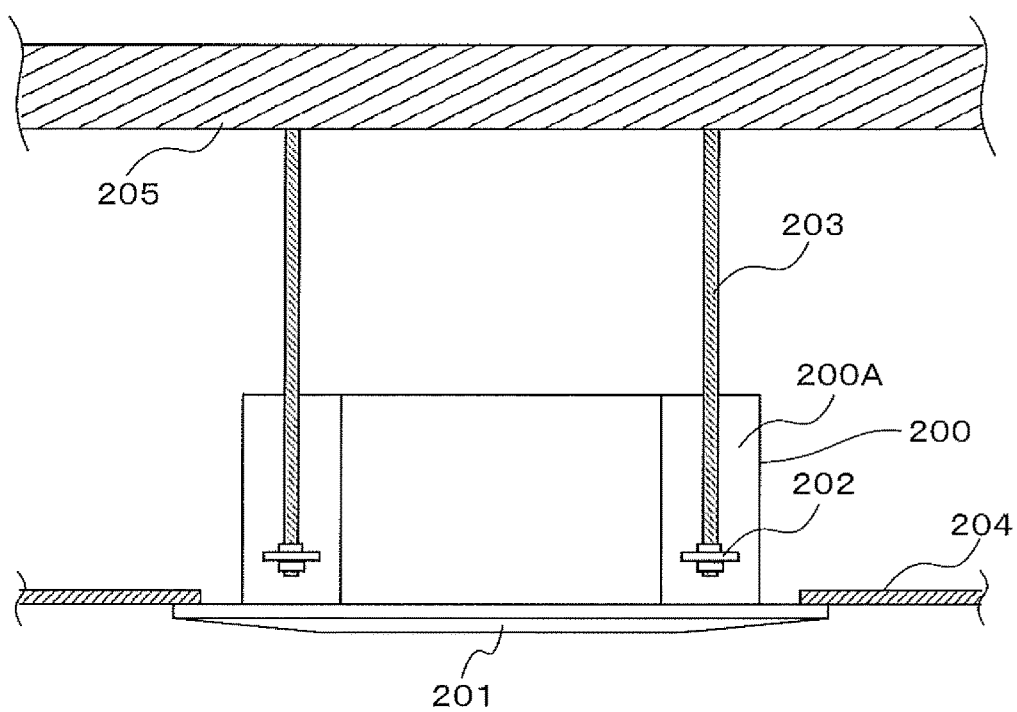
FIG. 9 is a diagram illustrating an installation case of an indoor unit of an air conditioner according to a third embodiment of the present invention.

In the first and second embodiments, descriptions have been given of the cases where the present invention is applied to the outdoor units of the air conditioners according to these embodiments, but the present invention may be applied to an indoor unit of an air conditioner. FIG. 9 is a diagram illustrating an installation case of an indoor unit 200 of an air conditioner according to a third embodiment of the present invention. As shown in FIG. 9, the indoor unit 200 of the air conditioner according to the present embodiment is a suspension type in which a casing 200A is suspended toward a ceiling surface 204. A decorative plate 201 is attached to the casing 200A on the side facing the ceiling surface 204. The indoor unit 200 is suspended from, and fixed to, a building frame 205 by hanging bolts 203 arranged in the building frame 205 and hanging brackets 202 included in the casing 200A. Note that the same configuration is also applicable to the case where an indoor unit is installed on the ceiling so as to be embedded therein, or fully exposed as is the case in a shop or the like. Leaving a space between the indoor unit 200 and the building frame 205, and the interval between the indoor units 200 are taught by the installation inspection procedure. However, the distance between the building frame 205 and the ceiling surface 204 varies depending on each building to cause the hanging bolts 203 to have different lengths in each building. Accordingly, the natural frequency of the indoor unit 200 of the air conditioner including the hanging bolts 203 is different in each building.

In view of this, the indoor unit 200 of the air conditioner according to the present embodiment has the resonance determination of the entire system by way of detecting pulsation of the motor current, as described in the first embodiment, included in a controller (not shown) of the indoor unit 200 of the air conditioner according to the present embodiment. That is, the controller 4 of the outdoor unit 1 of the air conditioner in FIG. 1 is mounted as the controller of the indoor unit 200 of the air conditioner according to the present embodiment to execute the resonance avoidance control as shown with the flowchart in FIG. 5 or 6. This allows the indoor unit 200 of the air conditioner according to the present embodiment to determine resonance of the entire system after installation. Using this resonance determination in controlling a rotation speed of the blower of the indoor unit 200 allows for avoiding resonance and reducing discomfort factors such as vibration and noise for the user of the air conditioner.

Fourth Embodiment

Figure 10:
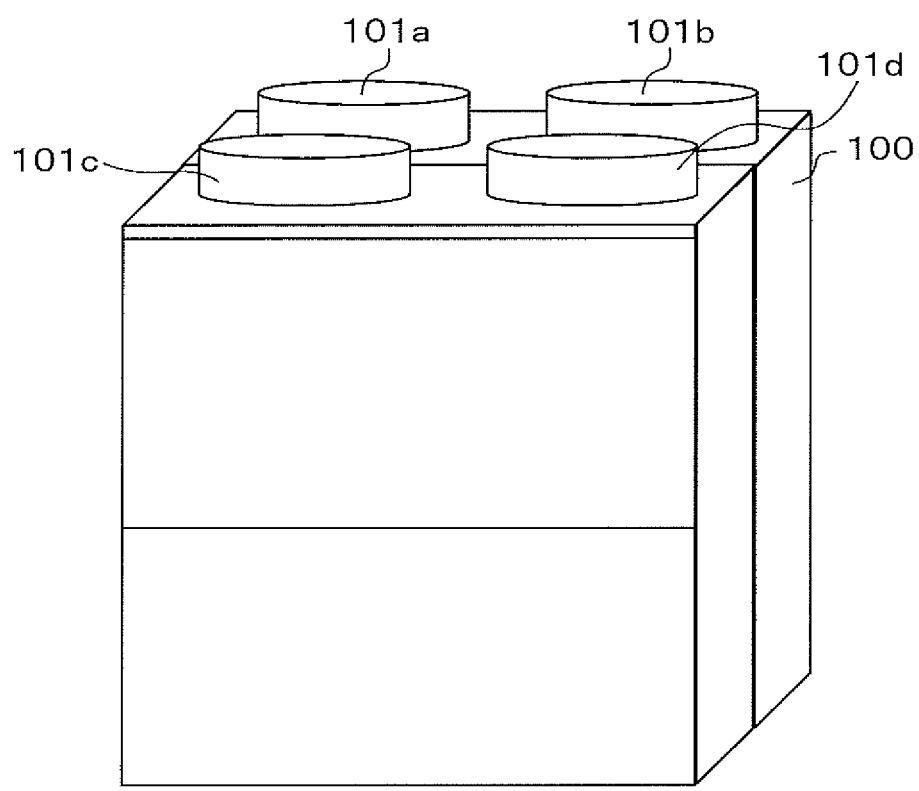
FIG. 10 is a diagram illustrating an installation case of an outdoor unit of an air conditioner according to a fourth embodiment of the present invention.

FIG. 10 is a diagram illustrating an installation case of an outdoor unit of an air conditioner according to a fourth embodiment of the present invention. The present embodiment is a case where a plurality of blowers 101a, 101b, 101c, 101d are arranged in the outdoor unit 100 of an air conditioner according to the present embodiment. As shown in FIG. 10, the outdoor unit 100 of the air conditioner according to the present embodiment includes the plurality of blowers 101a, 101b, 101c, 101d. The outdoor unit 100 having the plurality of blowers 101a, 101b, 101c, 101d has the resonance determination of the entire system by way of detecting pulsation of the motor current, as described in the first embodiment, included in a controller (not shown) of the outdoor unit 100 of the air conditioner according to the present embodiment to execute the resonance avoidance control shown with the flowchart in FIG. 5 or 6 for individual fans. In this manner, the same resonance avoidance control as in the first embodiment may be executed for individual fans, but in the case of having a plurality of blowers 101a, 101b, 101c, 101d, the following resonance avoidance control is more preferably executed.

That is, in the case where fan rotation speeds of the fans of the plurality of blowers 101a, 101b, 101c, 101d are equally increased, the more the number of blowers per one outdoor unit is, the more change in the total air volume will be caused. Therefore, in the case where a plurality of blowers 101a, 101b, 101c, 101d are arranged, the fan rotation speeds of the blowers 101a, 101b, 101c, 101d are preferably changed so that the sum of the amount-of-change-in-fan-rotation-speeds ΔF (see FIG. 6) of the blowers 101a, 101b, 101c, 101d is 0 rpm.

A case will be taken as an example where four blowers 101a, 101b, 101c, 101d are arranged per the single outdoor unit 100 of an air conditioner, as shown in FIG. 10. In this case, the fan rotation speeds are changed such as +5 rpm for the blower 101a, +10 rpm for the blower 101 b, −10 rpm for the blower 101c, and −5 rpm for the blower 101d so that the sum of the amount-of-change-in-fan-rotation-speeds ΔF is 0 rpm. Changing the fan rotation speeds so that the sum of the amount-of-change-in-fan-rotation-speeds ΔF is 0 rpm allows for avoiding resonance caused by the natural frequency of the system, in which the outdoor unit 100 of the air conditioner is installed, and making the change in the air volume as small as possible.

The present invention is not limited to the above-described embodiments, and includes other modifications and applications as far as they do not deviate from the spirit of the present invention as described in claims.

The respective embodiments hereinabove have been described in detail for the purpose of illustrating the present invention, but the present invention is not necessarily limited to those having all the components described above. In addition, a part or parts of the configuration of an embodiment may be replaced with a configuration or configurations of another embodiment, and also the configuration of an embodiment may be added with the configuration of another embodiment. Further, a part or parts of the configuration of each embodiment may be deleted, and/or added and/or replaced with other configuration or configurations.

The invention claimed is:

1. An air conditioner comprising:
a fan configured to blow air to a heat exchanger;
a motor configured to drive the fan included in a casing of either an outdoor unit or an indoor unit;
a rotation speed detector configured to detect a rotation speed of the motor;
a current detector configured to detect a current value of the motor;
a phase detector configured to detect a magnetic pole position of the motor;
a pulsation detector configured to detect a pulsation of the current value, based on the detected current value and the detected magnetic pole position of the motor; and
a resonance determiner configured to determine whether the casing of the outdoor unit or the indoor unit having the motor is in a resonance state, based on the detected pulsation of the current value and the detected rotation speed of the motor.

2. The air conditioner according to claim 1, further comprising a controller connected to the motor that is configured to, upon the resonance determiner determining the casing is in the resonance state, increase or decrease the rotation speed by a predetermined rotation speed.

3. The air conditioner according to claim 2, wherein the resonance determiner is configured to determine whether the casing is in the resonance state after the controller has increased or decreased the rotation speed, and determines that the resonance is in an abnormal state if the resonance state is determined.

4. The air conditioner according to claim 2, wherein the resonance determiner is configured to determine whether the casing is in a resonance state after the controller has increased or decreased the rotation speed, and the controller continues operation using the rotation speed if the resonance state is not determined.

5. The air conditioner according to claim 2, wherein the casing further includes a plurality of fans, including the fan, configured to blow air to the heat exchanger, and a plurality of motors, including the motor, respectively configured to drive the plurality of fans,
wherein upon the resonance determiner determining the casing is in the resonance state during the plurality of fans being in operation at a same predetermined rotation speed, the controller increases or decreases respective rotation speeds of the plurality of motors, individually, so that the mean of the increased or decreased rotation speeds of the plurality of fans equals the predetermined rotation speed.

* * * * *